March 4, 1969   E. RICKETT   3,430,285
HOLDER FOR WINDSHIELD WIPER BLADE
Filed Jan. 31, 1968

INVENTOR.
EDWARD RICKETT
BY
ATTORNEY

United States Patent Office 3,430,285
Patented Mar. 4, 1969

3,430,285
HOLDER FOR WINDSHIELD WIPER BLADE
Edward Rickett, Minneapolis, Minn., assignor to Daco, Inc., Minneapolis, Minn., a corporation of Colorado
Filed Jan. 31, 1968, Ser. No. 701,921
U.S. Cl. 15—250.42       9 Claims
Int. Cl. B60s 1/42

ABSTRACT OF THE DISCLOSURE

A holder for a windshield wiper blade includes a pair of metal ribbons which extend in grooves along opposite sides of a resilient wiper blade, providing lateral rigidity but longitudinal flexibility to permit the blade to conform to the curvature of a windshield, with each ribbon having a dimple adjacent its end, and an apertured U-shaped snap clip at each end passing over the dimple to releasably secure the ribbons together on the blade.

---

Vehicle windshield wipers, generally, consist of a resilient (usually rubber) blade, a backing for the blade to hold it laterally rigid, a support for the blade and backing, and an oscillating arm which is attached to a motor mounted on the vehicle. The rubber blade deteriorates rapidly because of the lengthy exposure to the elements, particularly sunlight and hydrocarbon residue precipitating onto the windshield from the air, and replacement should be accomplished frequently. Some wiper systems require replacement of the blade, the backing and support, while others require replacement of only the blade or the blade and backing. The ideal system, of course, replaces only the blade, and since it is less expensive to replace only the blade, is economically feasible to replace the blade frequently or as actually needed. Additionally, the replacement should be simple with minimum of tools and minimum of time required for the replacement, which aids the reduction of the cost of the replacement.

According to the present invention there is provided a holder or a backing system for a windshield wiper blade which is readily replaceable in a blade support, and is easily mounted on a resilient blade. The holder includes a pair of metal, preferably spring steel, ribbons which are placed in longitudinal slots along opposite sides of the resilient wiper blade holding the ribbon at right angles to the major dimension of the blade cross-section. The ends of the ribbon are secured together by U-shaped spring clamps. A boss or protuberance is formed adjacent the end of each ribbon, and the clip, having an opening in one leg of the U, is placed over the ends of the ribbon so that the boss extends into the clip opening and the clip is thereby held on the ribbon.

Included among the objects and advantages of the present invention is a holder or backing for a resilient, flexible windshield wiper blade which provides rigidity laterally of the blade, but permits substantial flexibility longitudinally of the blade so that it conforms to the curvature of the windshield and is held in wiping position thereon, and is readily replaceable in a wiper support.

Another object of the invention is to provide an inexpensive clip, which is easily removed, for the ends of a pair of side by side metal ribbons placed on a resilient windshield wiper blade, which securely holds the ribbons together.

These and other objects and advantages of the invention may be readily ascertained by referring to the following description and appended illustrations in which.

Figure 1:
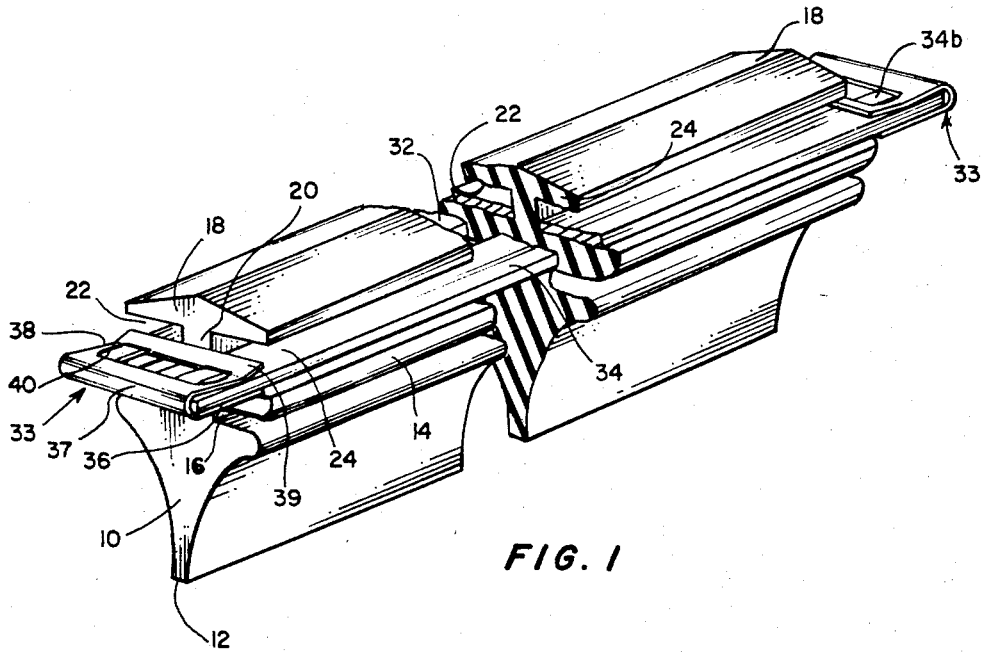
FIG. 1 is a perspective view, broken away at the middle, of a resilient windshield wiper blade, and a backing system according to the invention.
Figure 2:
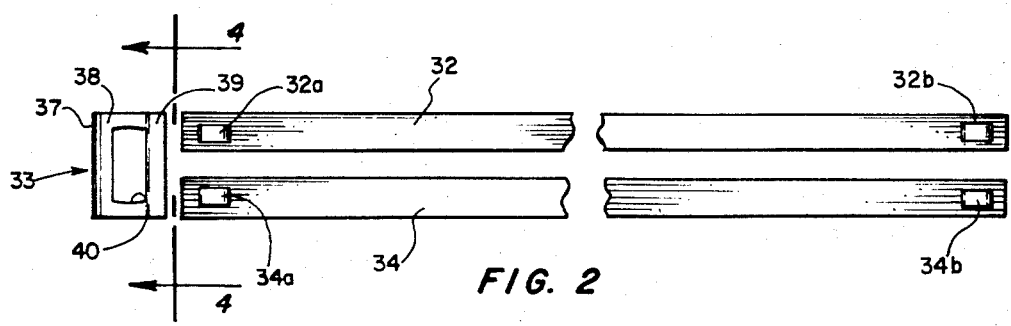
FIG. 2 is a top plan view of steel ribbons forming a portion of the backing system, of the invention, for flexible, resilient wiper blades.
Figure 3:
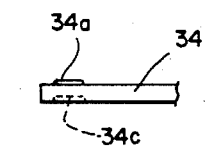
FIG. 3 is a fragmentary side elevational view of the end of a metal ribbon according to the invention illustrating the embossed protuberance thereon.
Figure 4:
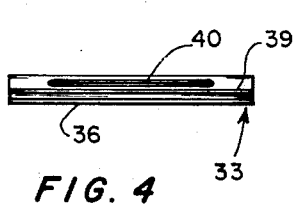
FIG. 4 is an end elevational view of a clip according to the invention.

In the embodiments selected for illustration, FIG. 1 shows, in general, a mounting of a holder, according to the invention, on a flexible, resilient windshield wiper blade. The blade may be considered typical of various types which utilize a removable backing formed of metal ribbons. The blade includes, in general, a rubber body 10, having a wiping edge 12, a lateral flange 14 mounted on a thin neck section 16, and a top flange portion 18 mounted on a thin neck section 20 secured to flange 14. The flanges form a pair of opposed slots 22 and 24 which extend longitudinally along the blade. A spring steel ribbon 32 is placed in one of the slots and a spring steel ribbon 34 is placed in the opposite slot and these are held together by a spring clip indicated, in general, by numeral 34. The ribbon extends slightly beyond the ends of the windshield wiper blade to accommodate the spring clips at each end. The metal ribbons are embossed adjacent each end to provide a bulge, or protuberance and as shown in FIGS. 2 and 3 the ribbon 34 has a bulge 32a at one end and 32b at the opposite end. In a similar manner the ribbon 34 has a boss or bulge 34a at one end and a similar boss or bulge 34b at the opposite end. The boss is formed by indenting the material, as shown in FIG. 3, to form an indentation 34c on one side of the ribbon leaving the bulge or protuberance 34a on the opposite side. The length of the ribbon is made to conform to the length of the blade for the particular vehicle with an overhang at each end. The blades may range from about 10 inches to about 18 inches or more depending on the particular type of vehicle. The bulge is formed adjacent the end and approximately centerwise of the ribbon so that the ribbons are reversible on the blade, that is, made to be used on either side.

Figure 5:
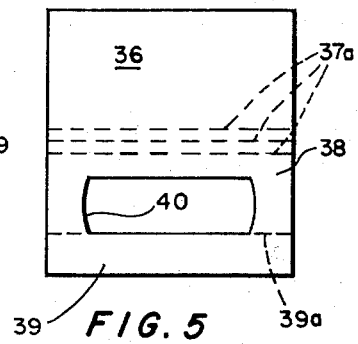
FIG. 5 is a top plan developed section of a clip according to the invention prior to being formed into its U-shaped, and illustrating the bend lines thereon.

The clip is a U-shaped piece of spring steel having an aperture in one leg of the U. As shown, one leg 36 of the U is approximately flat and it terminates in a reverse bend 37 of a relatively large radius of curvature which places the opposite leg 38 back along the first leg 36 at a slight angle converging on the lower leg. The edge 39 of the leg 38 is turned up slightly to permit easy entrance of the ends of the ribbons into the clip. A cut-out section 40 on the leg 38 permits entry of the bulges or bosses into the cut-out so that the clip is securely held on the ribbon. The width of the clip is slightly wider than twice the width of one ribbon, which permits two ribbons with the clips to encompass the neck 20 of the blade and be fairly loose thereon. The thickness of the ribbon, of course, is less than the width of the slot since it is desired that the ribbon be sloppy in the slot to permit the blade free flexible action while being held laterally rigid. As shown in the developed section of FIG. 5, a flat piece of spring steel is initially punched to form the opening 40. The lip 39 is turned up along a bend line 39a. The member is then formed into a U-shaped configuration by folding it back along itself at the three fold lines 37a in approximately the middle of the clip to provide a rounded configuration for the bend.

The holder or backing may be easily mounted on the blade by inserting the ribbons into the slots on the blade, holding the ribbons together against the neck 20 and then pushing a clip over each end of the ribbon so that the protuberances enter the aperture in the clip. The clips, being spring steel, and having their legs in close proximity to one another, are held securely by the protuberances in their openings. A clip is placed on each end of the pair of ribbons, and the blade is then ready to be inserted into the blade support which is mounted on the oscillating arm of the wiper assembly. The arrangement provides freedom of action of the resilient blade, but secures it so that it conforms to the windshield curvature. The blade is held against bending laterally, and it is free to flop over for wiping.

While the invention has been illustrated by reference to particular embodiment there is no intent to limit the spirit or scope of the invention to the precise details so set forth except as defined in the following claims.

What is desired to be claimed is as follows:

1. A holder for a flexible, resilient windshield wiper blade comprising a pair of elongated metal ribbons arranged for lying flat in spaced apart side by side relation on opposed sides of the wiper blade for supporting a flexible, resilient blade to permit it to flex longitudinally but be rigid laterally; each said ribbon having a protuberance adjacent each end thereof; and a U-shaped clip mounted over each of the opposite ends of said ribbons when mounted in side by side, said clip including an aperture into which both protuberances on the ends of the side by side ribbons are positioned and the ribbons are retained thereby, said aperture being wide enough to permit said ribbons to move a limited distance apart and be retained in said clip.

2. A holder according to claim 1 wherein said protuberances are embossed in the metal ribbons.

3. A holder according to claim 1 wherein said protuberances are formed centerwise between the sides of said ribbons and are spaced from and adjacent to the ends of said ribbons.

4. A clip for holding the ends of a pair of metal ribbons flat and in close side by side proximity to each other, the ends of each ribbon having a protuberance on at least one side and adjacent the end thereof comprising a spring steel, U-shaped body with the legs thereof normally converging together at a point spaced from the ends thereof; the edge of at least one leg being turned back away from the other leg forming a mouth for insertion of said ribbons; and an aperture in at least one leg of said U-shaped body arranged to permit entry of both protuberances of side by side ribbons, said aperture being wide enough to permit limited movement of said ribbons toward and away from each other.

5. A clip according to claim 4 wherein one leg of said clip extends straight from the U-portion end to the other end, the other leg converges on said straight leg.

6. A clip according to claim 5 wherein said aperture is in the said other leg which converges on said straight leg.

7. A clip according to claim 4 wherein said turned back edge of at least one leg is on said converging leg.

8. A clip according to claim 4 wherein said aperture is generally rectangular.

9. A clip according to claim 4 wherein said body has a width greater than the width of two side by side ribbons to encompass the ends therein and permit limited movement of said ribbons.

References Cited

UNITED STATES PATENTS

| 2,983,945 | 5/1961 | De Pew | 15—250.42 |
| 3,083,394 | 4/1963 | Scinta | 15—250.42 XR |

FOREIGN PATENTS

| 1,446,657 | 6/1966 | France. |

PETER FELDMAN, *Primary Examiner.*